(12) United States Patent
Jin et al.

(10) Patent No.: US 11,070,135 B2
(45) Date of Patent: Jul. 20, 2021

(54) CONVERTER WITH SOFT-START PERIOD OF OUTPUT VOLTAGE

(71) Applicant: DELTA ELECTRONICS, INC., Taoyuan (TW)

(72) Inventors: Da Jin, Taoyuan (TW); Ya-Hong Xiong, Taoyuan (TW); Qing-Hua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/578,405

(22) Filed: Sep. 23, 2019

(65) Prior Publication Data
US 2020/0099309 A1 Mar. 26, 2020

(30) Foreign Application Priority Data

Sep. 26, 2018 (CN) .......................... 201811126353.0

(51) Int. Cl.
*H02M 3/335* (2006.01)
*H02M 1/08* (2006.01)
*H02M 1/36* (2007.01)
*H02M 1/00* (2006.01)

(52) U.S. Cl.
CPC ....... *H02M 3/33569* (2013.01); *H02M 1/083* (2013.01); *H02M 1/36* (2013.01); *H02M 2001/0058* (2013.01)

(58) Field of Classification Search
CPC ............ H02M 3/335; H02M 3/33507; H02M 3/33538; H02M 3/33569; H02M 3/33592; H02M 3/3376; H02M 3/338; H02M 3/3381; H02M 3/3385; H02M 2001/0058

USPC .................................................... 363/16–20
See application file for complete search history.

(56) References Cited

U.S. PATENT DOCUMENTS

| 8,036,000 B2 * | 10/2011 | Ying | H02M 3/3376 363/21.02 |
| 10,110,138 B1 * | 10/2018 | Murthy-Bellur | H02M 3/33584 |
| 2008/0024094 A1 * | 1/2008 | Nishihara | H02M 3/3376 323/233 |
| 2008/0247194 A1 | 10/2008 | Ying et al. | |

(Continued)

FOREIGN PATENT DOCUMENTS

| CN | 103973092 A | 8/2014 |
| CN | 104704731 A | 6/2015 |

(Continued)

*Primary Examiner* — Yemane Mehari
(74) *Attorney, Agent, or Firm* — CKC & Partners Co., LLC

(57) ABSTRACT

A converter includes an input capacitor, a primary-side switch circuit, a transformer, an inductor, a secondary-side switch circuit, and an output capacitor. The primary-side switch circuit includes a first and a second bridge arm. Each of the first and the second bridge arm includes at least two switches. A soft-start period of an output voltage from the converter includes a voltage rising period of the output voltage. A turn-on time of one of the at least two switches of the first bridge arm is less than ½ of a switching period. A turn-on time of one of the at least two switches of the second bridge arm is zero of the switching period or near zero of the switching period. The inductor and parasitic capacitors of the at least two switches of the second bridge arm oscillate, and energy generated from an oscillation is transmitted to the second-side switch circuit.

20 Claims, 9 Drawing Sheets

(56) References Cited

U.S. PATENT DOCUMENTS

| | | | | |
|---|---|---|---|---|
| 2010/0259951 A1* | 10/2010 | Adragna | ............... | H02M 3/337 |
| | | | | 363/17 |
| 2011/0249472 A1* | 10/2011 | Jain | ................... | H02M 3/33584 |
| | | | | 363/15 |
| 2012/0249059 A1* | 10/2012 | Matsu Mae | ........... | H02M 3/337 |
| | | | | 320/107 |
| 2013/0314950 A1* | 11/2013 | Hembach | .......... | H02M 3/33592 |
| | | | | 363/17 |
| 2016/0211690 A1* | 7/2016 | Li | ........................... | H02M 1/42 |

FOREIGN PATENT DOCUMENTS

| | | | |
|---|---|---|---|
| CN | 105763034 | A | 7/2016 |
| CN | 107231086 | A | 10/2017 |
| WO | 2014098221 | A1 | 6/2014 |
| WO | 2017168220 | A1 | 10/2017 |

* cited by examiner

CONVERTER WITH SOFT-START PERIOD OF OUTPUT VOLTAGE

RELATED APPLICATIONS

This application claims priority to China Application Serial Number 201811126353.0, filed Sep. 26, 2018, which is herein incorporated by reference.

BACKGROUND

Field of Invention

The present disclosure relates to a voltage conversion device. More particularly, the present disclosure relates to a converter.

Description of Related Art

In order to increase the efficiency of a conversion system, a bus converter usually uses an unadjusted scheme of 54V to 12V. For example, the switch operates at a fixed duty ratio, so that the advantages of maximum duty ratio, minimum current effective value, and smallest size of filter can be obtained. The circuit topology commonly used for the above bus converter has a full bridge circuit on its primary side, and a center-tap full wave rectifier circuit on its secondary side.

The above bus converter belongs to a topology of a traditional pulse width modulation (PWM) switch circuit. This kind of switch circuit has a large switching loss and the reverse recovery loss of the full wave rectifier switch is also large. As a result, the switching frequency of the converter is excessively low, and thereby the size of the transformer and the output inductor are bulky. The soft-start of the output voltage of the above switching converter is usually achieved by controlling the duty ratio to gradually increase from 0. However, the above soft-start method is only applicable to the converter structure having an output inductor. For a converter without an output inductor, the output voltage, initial value of which is 0, is instantaneously raised at the moment when the switch is turned on.

In the soft-start method for a traditional resonant circuit, a switch is connected in series between the input capacitor and the primary-side full bridge circuit. By controlling the voltage value of the drive signal of the switch, the switch operates in the linear region. In this manner, the current overshoot at the moment when the primary-side and secondary-side switch circuits are turned on can be suppressed through controlling the on-state impedance of the switch, thus realizing the soft-start of the output voltage of the converter. However, the above soft-start method requires additional switching element, which in turn increases the cost of the converter. In addition, the implementation of the overall control scheme is more complex because of the additionally needed switch.

For the foregoing reasons, there is a need to resolve the above-mentioned problems by providing a converter.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

A converter is provided. The converter comprises an input capacitor, a primary-side switch circuit, a transformer, an inductor, a secondary-side switch circuit, and an output capacitor. The primary-side switch circuit comprises a first bridge arm and a second bridge arm. Each of the first bridge arm and the second bridge arm comprises at least two switches. The primary-side switch circuit is coupled to the input capacitor. The at least two switches of the first bridge arm are coupled in series, and the at least two switches of the second bridge arm are coupled in series. The transformer is coupled to the primary-side switch circuit. The inductor is coupled to the primary-side switch circuit. The inductor is a leakage inductor of the transformer or an external inductor coupled between the transformer and the primary-side switch circuit. The secondary-side switch circuit is coupled to the transformer. The output capacitor is coupled to the secondary-side switch circuit. The input capacitor is configured to receive an input voltage. A soft-start period of an output voltage from the converter comprises a voltage rising period of the output voltage. A turn-on time of one of the at least two switches of the first bridge arm is less than ½ of the switching period. A turn-on time of one of the at least two switches of the second bridge arm is a value selected from zero to $\frac{1}{100}$ of the switching period. The inductor and parasitic capacitors of the at least two switches of the second bridge arm oscillate, and energy generated from an oscillation is transmitted to the second-side switch circuit.

The disclosure provides a converter. The converter comprises an input capacitor, a primary-side switch circuit, a transformer, an inductor, a secondary-side switch circuit, and an output capacitor. The primary-side switch circuit comprises a first bridge arm and a second bridge arm. Each of the first bridge arm and the second bridge arm comprises at least two switches. The primary-side switch circuit is coupled to the input capacitor. The at least two switches of the first bridge arm are coupled in series, and the at least two switches of the second bridge arm are coupled in series. The transformer is coupled to the primary-side switch circuit. The inductor is coupled to the primary-side switch circuit. The inductor is a leakage inductor of the transformer or an external inductor coupled between the transformer and the primary-side switch circuit. The secondary-side switch circuit is coupled to the transformer. The output capacitor is coupled to the secondary-side switch circuit. The input capacitor is configured to receive an input voltage. A soft-start period of an output voltage from the converter comprises a voltage rising period of the output voltage. A turn-on time of one of the at least two switches of the first bridge arm is less than ½ of the switching period. A turn-on time of one of the at least two switches of the second bridge arm is greater than 0 and less than ½ of the switching period. The at least two switches of the first bridge arm comprises an upper switch and a lower switch. The at least two switches of the second bridge arm comprises an upper switch and a lower switch. A turn-on time of the lower switch of the second bridge arm is less than a turn-on time of the upper switch of the first bridge arm. A turn-on time of the upper switch of the second bridge arm is less than a turn-on time of the lower switch of the first bridge arm. The inductor oscillates with parasitic capacitors of the at least two switches of the second bridge arm or the input capacitor, and energy generated from an oscillation is transmitted to the second-side switch circuit.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

As used herein, "couple" refers to direct physical contact or electrical contact or indirect physical contact or electrical contact between two or more elements. Or it can also refer to reciprocal operations or actions between two or more elements.

Figure 1:
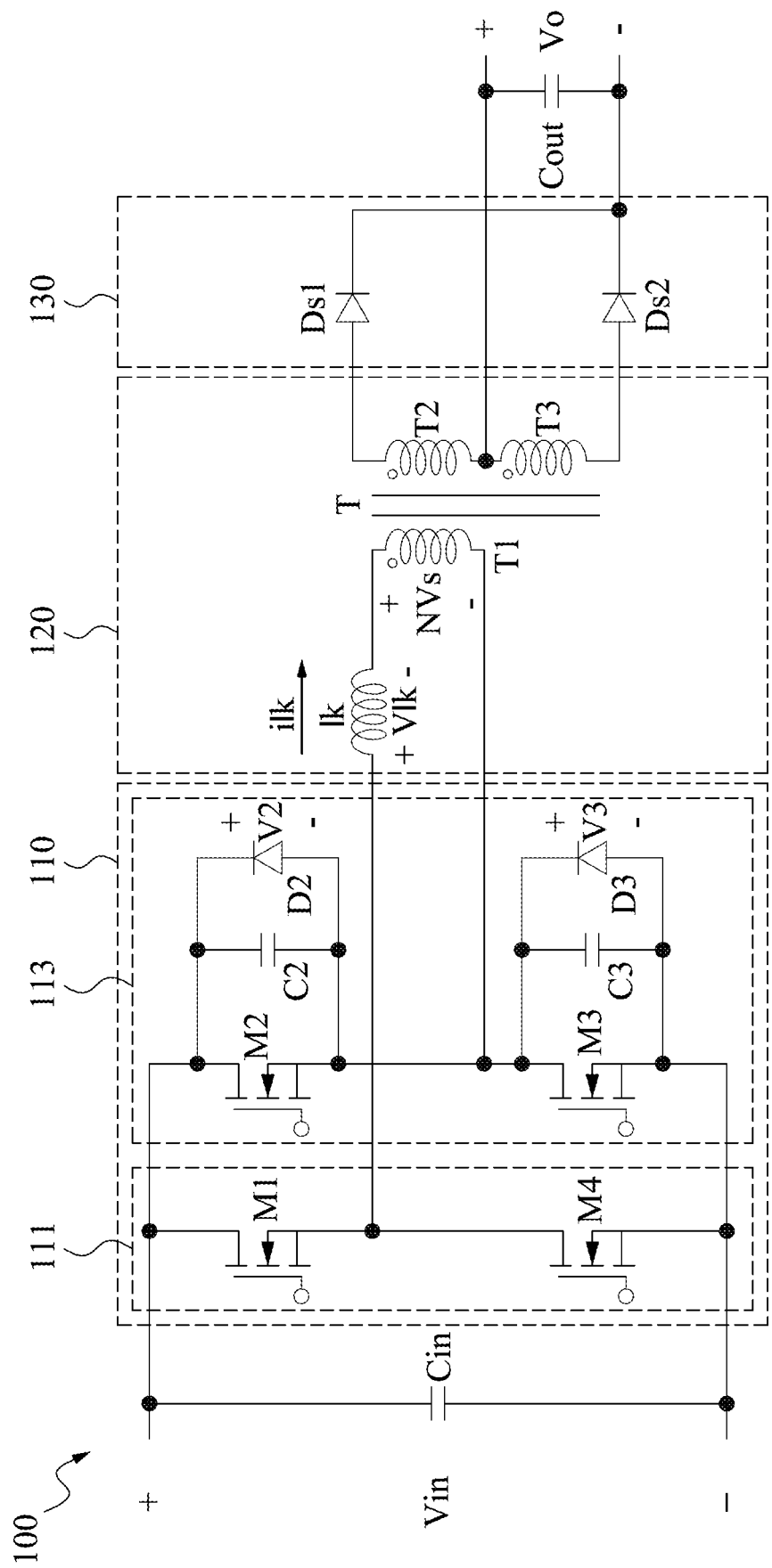
FIG. 1 depicts a schematic diagram of a circuit of a converter according to one embodiment of the present disclosure.

FIG. 1 depicts a schematic diagram of a circuit of a converter 100 according to one embodiment of the present disclosure. As shown in the figure, the converter 100 includes an input capacitor Cin, a primary-side switch circuit 110, a transformer 120, a secondary-side switch circuit 130, and an output capacitor Cout. The primary-side switch circuit 110 is coupled to the input capacitor Cin. The transformer 120 is coupled to the primary-side switch circuit 110. The secondary-side switch circuit 130 is coupled to the transformer 120. The output capacitor Cout is coupled to the secondary-side switch circuit 130.

In the present embodiment, the primary-side switch circuit 110 includes a first bridge arm 111 and a second bridge arm 113. Each of the first bridge arm 111 and the second bridge arm 113 includes at least two switches. For example, the first bridge arm 111 includes an upper switch M1 and a lower switch M4, and the second bridge arm 113 includes an upper switch M2 and a lower switch M3. In addition, the at least two switches of the first bridge arm 111 are coupled in series, and the at least two switches of the second bridge arm 113 are coupled in series. As shown in the figure, the switches M1, M4 of the first bridge arm 111 are coupled in series, and the switches M2, M3 of the second bridge arm 113 are coupled in series according to one embodiment.

In another embodiment, an inductor may be a leakage inductor of the transformer 120 or an external inductor coupled between the transformer 120 and the primary-side switch circuit 110. Here, the inductor being the leakage inductor of the transformer 120 is taken as an example. As shown in the figure, the transformer 120 includes a leakage inductor Lk.

Figure 2:
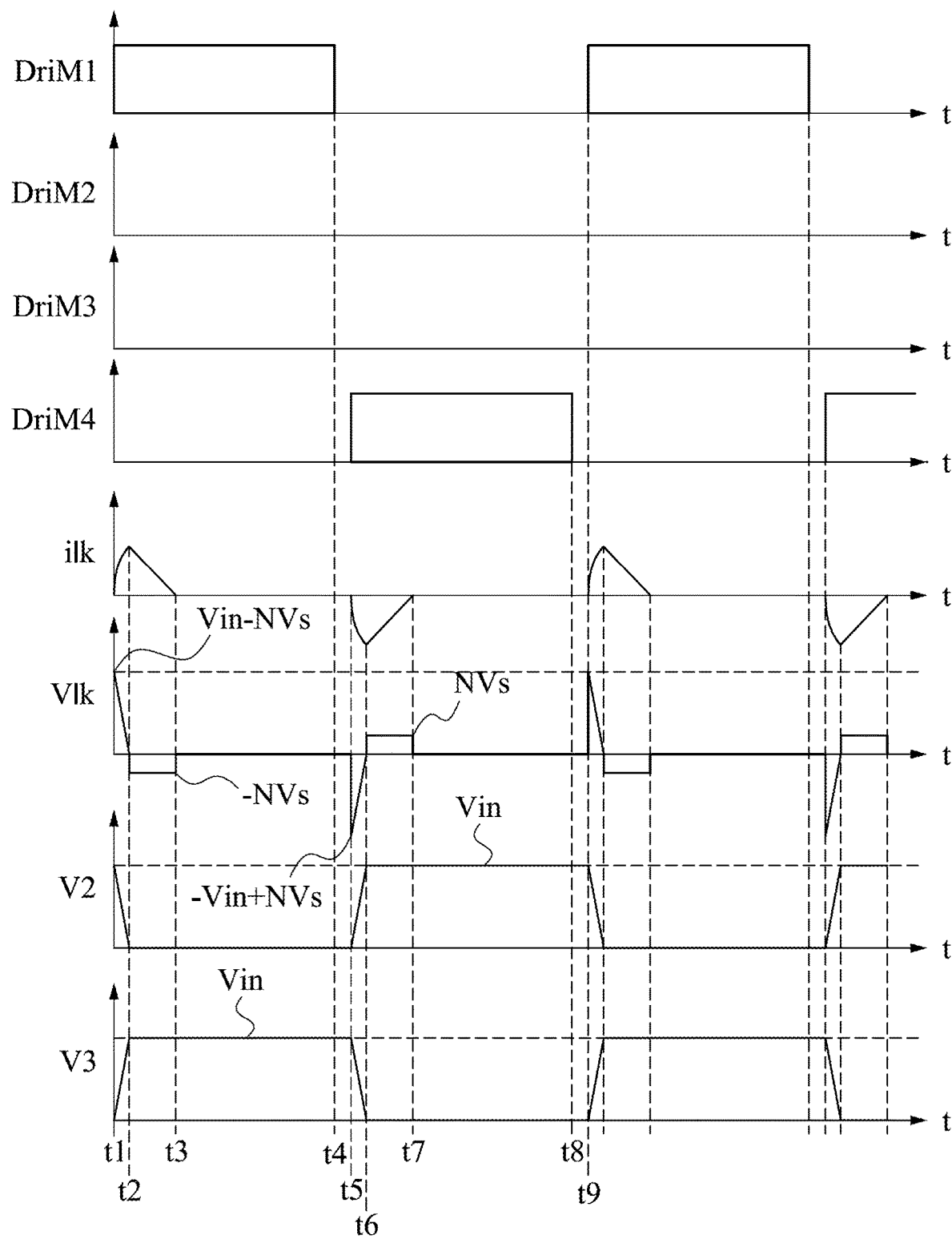
FIG. 2 depicts a schematic diagram of drive waveforms of a converter according to one embodiment of the present disclosure.

The input capacitor Cin is configured to receive an input voltage Vin. A soft-start period of an output voltage Vout from the output capacitor Cout of the converter 100 includes a voltage rising period of the output voltage Vout. In order to illustrate the operations of the converter 100 shown in FIG. 1 in detail, a description is provided with reference to FIG. 2. FIG. 2 depicts a schematic diagram of drive waveforms of the converter 100 according to one embodiment of the present disclosure.

A description is provided with reference to FIG. 1 and FIG. 2. The interval of the switching period tsw is t1-t9. When the drive signal DriM1-DriM4 for the switch M1-M4 is on the high level, the switch M1-M4 will be on the "ON" state. In one embodiment, the switch M1 of the first bridge arm 111 is ON during the interval t1-t4 based on the drive signal DriM1. The switch M4 of the first bridge arm 111 is ON during the interval t5-t8 based on the drive signal DriM4. Each duration of the interval t1-t4 and the interval t5-t8 is less than a half of the switching period tsw. The duration of the interval t1-t4 may or may not be equal to the duration of the interval t5-t8. A respective turn-on time of the switches M2, M3 in one switching period is only a tiny fraction of the switching period, which can be but not limited to [0–0.01]*tsw. In one embodiment, the turn-on time of the lower switch M3 is less than the turn-on time of the upper switch M1 and the turn-on time of the upper switch M2 is less than the turn-on time of the lower switch M4. In order to facilitate understanding, the drive method shown in FIG. 2 (such as the voltage soft-start method) is taken as an example to illustrate the above drive method as follows. The turn-on time of the switch M1 and the switch M4 in the first bridge arm 111 is half of the switching period tsw of the converter 100, and the switch M1 and the switch M4 are operated about 180 degrees out of phase with each other. In addition, the turn-on time of the switch M2 and the switch M3 in the second bridge arm 113 is essentially equal to 0 respectively. Additionally, the two drive signals DriM1 and DriM4 are complementary to each other, and there is a dead zone period (such as a period t4-t5) exists between the two drive signals, during which all switches are OFF.

Figure 3:
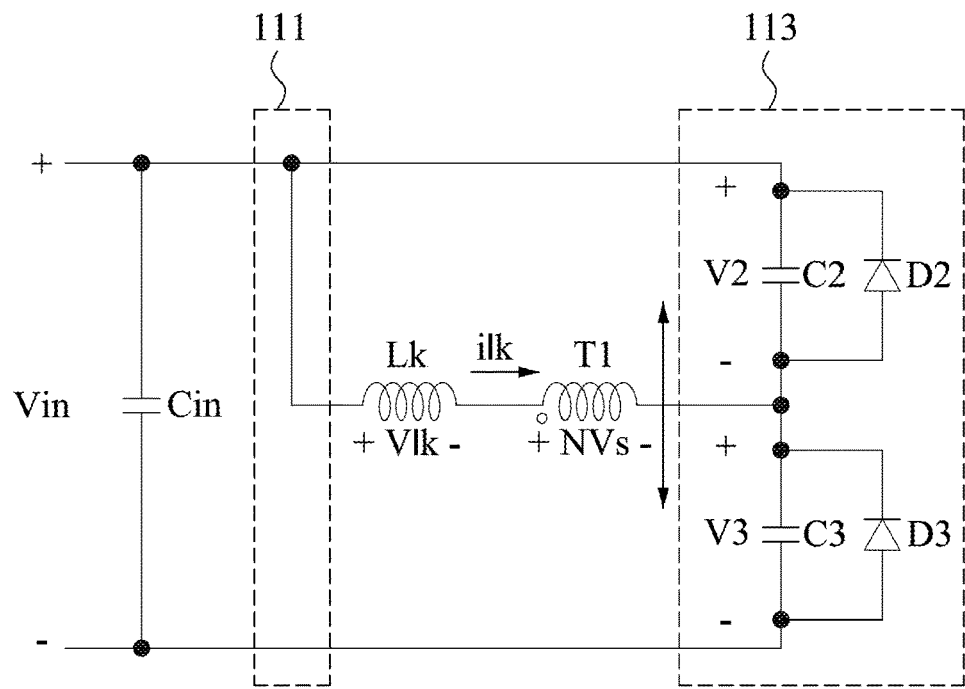
FIG. 3 depicts a schematic diagram of operations of a converter according to one embodiment of the present disclosure.

When the output voltage Vo is 0, the switch M1 is turned on at time t1. A voltage V2 across two terminals of the switch M2 is Vin, and a voltage V3 across two terminals of the switch M3 is 0. A voltage Vlk across two terminals of the leakage inductor Lk of the transformer 120 is Vin-NVs. The above N is a turn ratio of a primary-side winding to a secondary-side winding of the transformer 120, and Vs is a sum of the output voltage Vo on a secondary side and an on-voltage drop of diodes Ds1 and Ds2. At this time, the leakage inductor Lk of the transformer 120 oscillates with parasitic capacitors C2, C3 of the switches M2, M3. The above operations may be referred to the circuit operation diagram shown in FIG. 3 to facilitate understanding. A leakage inductor current ilk flowing through the leakage inductor Lk of the transformer 120 rises from 0, the voltage V2 across two terminals of the switch M2 starts to fall, and the voltage V3 across two terminals of the switch M3 starts to rise. At time t2, the voltage V2 across two terminals of the switch M2 drops to 0, and when the voltage V3 across two terminal of the switch M3 rises to the input voltage Vin, the rise of the leakage inductor current ilk ends.

Figure 4:
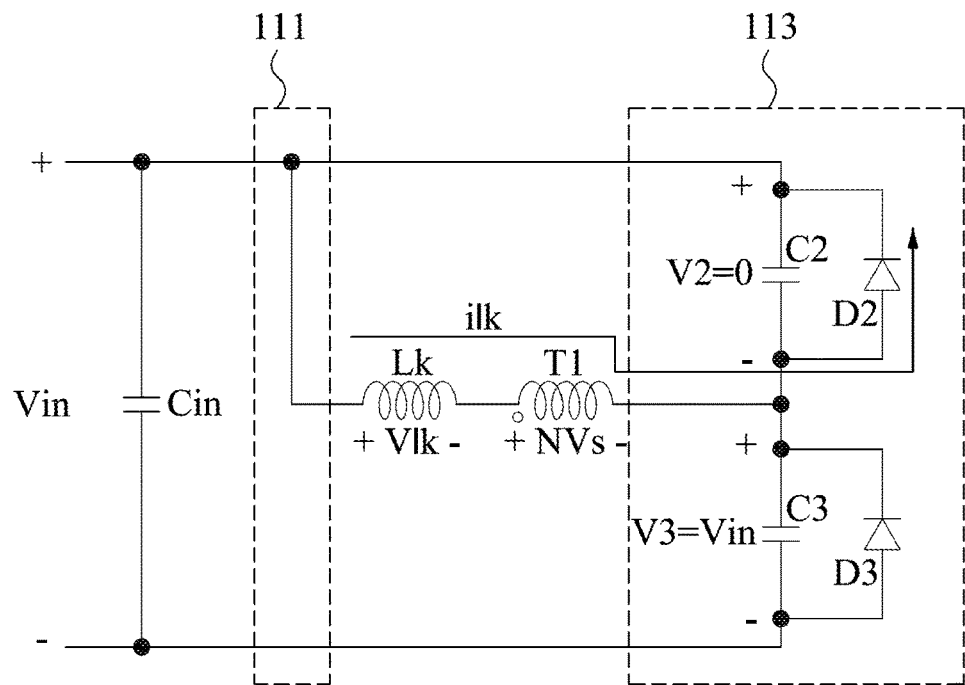
FIG. 4 depicts a schematic diagram of operations of a converter according to one embodiment of the present disclosure.

A description is provided with reference to FIG. 1 and FIG. 2. During a period t2-t3, the voltage Vlk across two terminals of the leakage inductor Lk of the transformer 120 is subjected to a reverse voltage NVs. At this time, the leakage inductor current ilk is freewheeled through a body diode D2 of the switch M2. The above operations may be referred to the circuit operation diagram shown in FIG. 4 to facilitate understanding. At this time, the leakage inductor current ilk drops linearly. At time t3, the leakage inductor current ilk drops to zero and the freewheeling ends. During a period t1-t3, energy is transmitted to the secondary-side switch circuit 130 via the transformer 120, so that the output voltage Vo rises. By using the above drive method, the energy transmitted to the secondary side is lesser to complete the voltage soft start.

Figure 5:
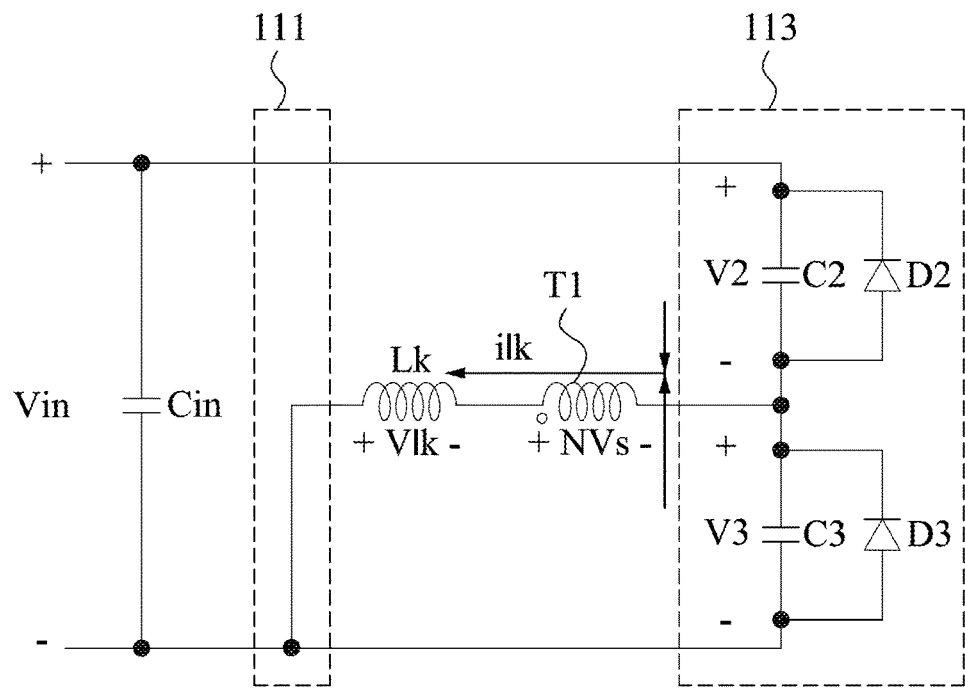
FIG. 5 depicts a schematic diagram of operations of a converter according to one embodiment of the present disclosure.

In addition, the period t4-t5 is the dead zone period. At time t5, the switch M4 is turned on. The voltage V2 across two terminals of the switch M2 is 0, and the voltage V3 across two terminals of the switch M3 is the input voltage Vin. The voltage Vlk_across two terminals of the leakage inductor Lk of the transformer 120 is −Vin+NVs. The leakage inductor Lk of the transformer 120 starts to oscillate with the parasitic capacitors C2, C3 of the switches M2, M3. The above operations may be referred to the circuit operation diagram shown in FIG. 5 to facilitate understanding. At this time, the leakage inductor current ilk flowing through the leakage inductor Lk of the transformer 120 starts to rise in reverse from 0, the voltage V2 across two terminals of the switch M2 starts to rise, and the voltage V3 across two terminals of the switch M3 starts to drop. At time t6, the reverse rise of the leakage inductor current ilk ends when the voltage V3 across two terminal of the switch M3 drops to 0.

Figure 6:
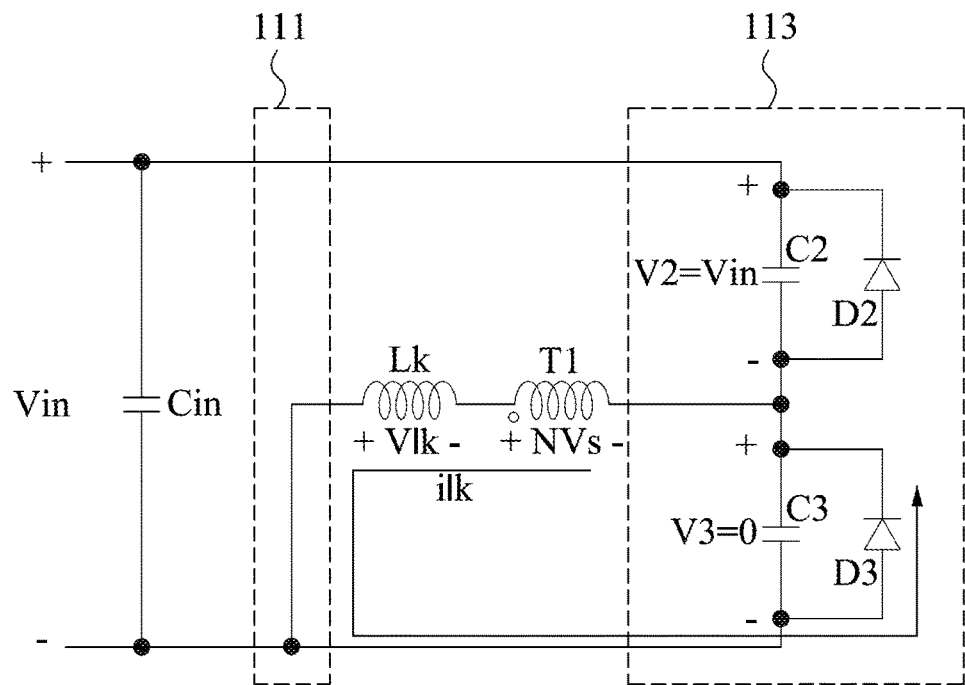
FIG. 6 depicts a schematic diagram of operations of a converter according to one embodiment of the present disclosure.

A description is provided with reference to FIG. 1 and FIG. 2. During a period t6-t7, the voltage Vlk across two terminals of the leakage inductor Lk of the transformer 120 is NVs. At this time, the leakage inductor Lk of the transformer 120 and a body diode D3 of the switch M3 freewheels. The above operations may be referred to the circuit operation diagram shown in FIG. 6 to facilitate understanding. The leakage inductor current ilk starts to drop in reverse. At time t7, the leakage inductor current ilk drops to zero and the freewheeling ends. During a period t5-t7, energy is transmitted to the secondary-side switch circuit 130 via the transformer 120, so that the output voltage Vo rises. In addition to that, a period t8-t9 is a dead zone period. A whole period t1-t9 is a control period, that is, the switching period tsw of the converter.

In one embodiment, in one switching period tsw, energy is transmitted from the primary side to the secondary side only during the period t1-t3 and the period t5-t7, and the energy transmitted each time is lesser. The output voltage Vo thus rises slowly to achieve a soft start. During the period t3-t4 and the period t7-t8, as shown in the figure, both the voltage and current remain unchanged. Therefore, the soft-start function can be realized when the respective turn-on time of the two switches M1 and M4 of the first bridge arm 111 is ended at any point from 0 to ½ tsw in the above working state, for example, when the turn-on time is ended at ⅓ tsw, the above soft-start function can be realized. In one embodiment, the turn-on time of the upper and lower switches M1 and M4 of the first bridge arm 111 may be equal or not equal, and may be set depending on practical needs. In one embodiment, the soft-start function can be realized when a respective turn-on time of each of the two switches M1 and M4 of the first bridge arm 111 is ended at any point from a minimum turn-on time tmin to ½ tsw, and the minimum turn-on time tmin can be set based on a lower limit value of a turn-on time of a controller. In another embodiment, the minimum turn-on time tmin is greater than 0 and at least greater than a respective turn-on time of each of the two switches M2 and M3 of the second bridge arm 113.

A description is provided with reference to FIG. 1. In one embodiment, the transformer 120 includes a magnetic core, the primary-side winding, and the secondary-side winding. The primary-side winding is coupled to the primary-side switch circuit 110. The secondary-side winding is coupled to the secondary-side switch circuit 130. For example, the primary-side winding includes at least one winding T1, which is coupled to the primary-side switch circuit 110. The secondary-side winding includes at least two windings T2, T3, which are coupled to the secondary-side switch circuit 130. The winding T1 and the windings T2, T3 are coupled through the magnetic core. The two windings T2, T3 are connected in series and have a center tap. The secondary-side winding of the transformer 120 and the secondary-side switch circuit 130 form a center-tap full wave rectifier circuit, and is connected in parallel with the output capacitor Cout to form an output terminal of the converter 100. However, the present disclosure is not limited to the structure shown in FIG. 1, which is only used to illustrate one of the implementation methods of the present disclosure by taking an example. For example, in other embodiments, the secondary-side winding may include a single winding, so that the single winding of the secondary-side winding of the transformer 120 and the secondary-side switch circuit 130 form a full bridge rectifier circuit. In addition, in the implementation where the secondary-side winding includes the single winding, the single winding of the secondary-side winding of the transformer 120 and the secondary-side switch circuit 130 may be configured to form a half wave rectifier circuit depending on practical needs.

Figure 7:
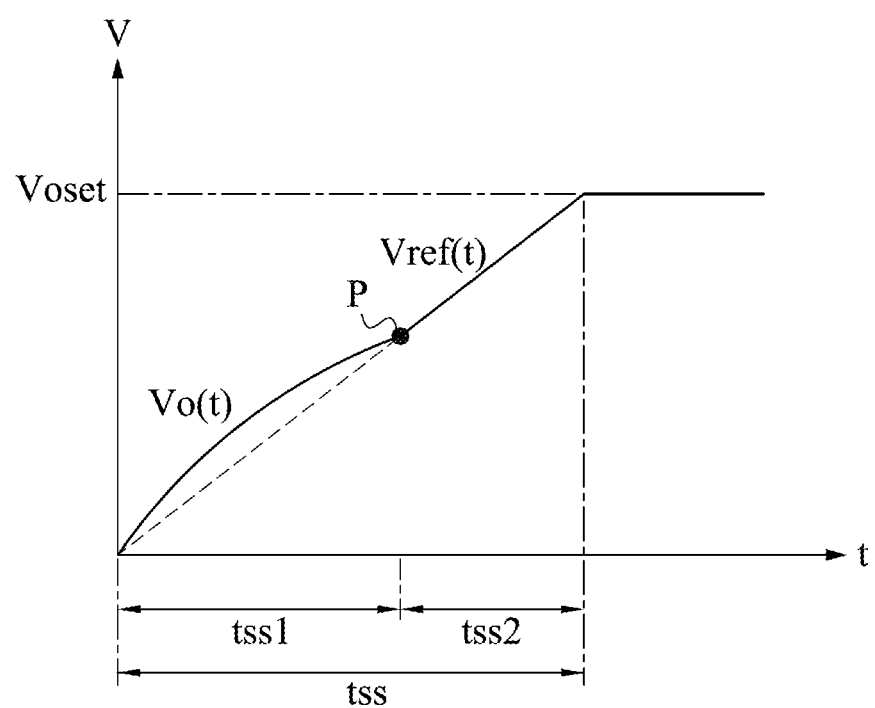
FIG. 7 depicts a schematic diagram of waveforms of an output voltage and a reference voltage of a converter according to one embodiment of the present disclosure.

FIG. 7 depicts a schematic diagram of waveforms of an output voltage and a reference voltage of a converter according to one embodiment of the present disclosure. A description is provided with reference to FIG. 1 and FIG. 7. As shown in the figures, Vo(t) is an output voltage of the converter 100, and Vref(t) is a reference voltage. The reference voltage is set based on the specification requirements of the output voltage and a startup time. Generally speaking, a reference voltage curve is a curve in which the output voltage Vo(t) rises linearly to a target output voltage Voset within the start-up time tss. When the output voltage Vo(t) is greater than the reference voltage Vref(t), the switches M1, M4 of the primary-side switch circuit 110 of the converter 100 are turned on. If the output voltage Vo(t) is less than the reference voltage Vref(t), the increasing speed of output voltage Vo(t) will become slowly. At this time, the switches M2, M3 of the primary-side switch circuit 110 can be turned on with turning on the switches M1, M4 of the primary-side switch circuit 110, thereby increasing the energy transmitted to the secondary side. After that, if the output voltage Vo(t) is greater than the reference voltage Vref(t), the switches M2 and M3 of the primary-side switch circuit 110 need to be turned off at this time, so that the output voltage Vo(t) follows the reference voltage Vref(t) and continues rising until the target output voltage Voset is reached.

For example, during a period tss1, only the switches M1, M4 of the primary-side switch circuit 110 are turned on because the output voltage Vo(t) is greater than the reference voltage Vref(t). As shown in the FIG. 7, the output voltage Vo(t) is going to approach to the reference voltage Vref(t) at point P. Hence, during a period tss2, the switches M1 and M4 of the primary-side switch circuit 110 and the switches M2 and M3 of the primary-side switch circuit 110 are respectively turned on to increase the energy transmitted to the secondary side so as to realize the soft start of the output voltage.

Figure 8:
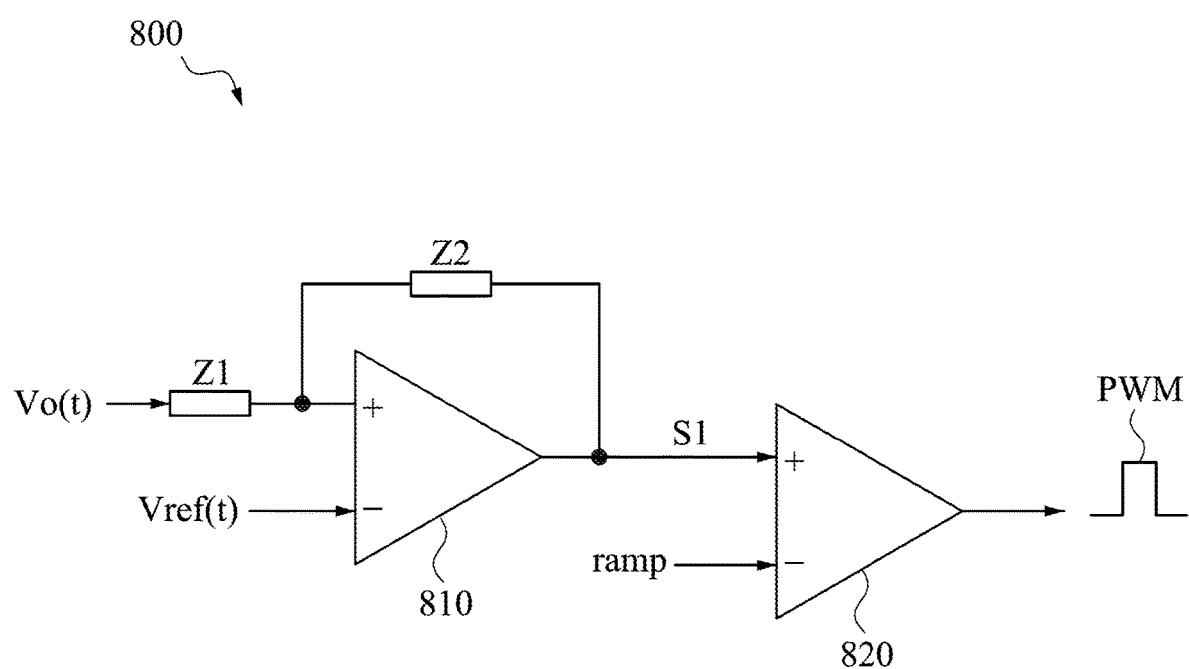
FIG. 8 depicts a schematic diagram of a comparison circuit according to one embodiment of the present disclosure.

FIG. 8 depicts a schematic diagram of a comparison circuit 800 according to one embodiment of the present disclosure. A description is provided with reference to FIG. 8. The comparison circuit 800 may be configured to realize the control method shown in FIG. 7. A proportional integral regulator 810 receives the output voltage Vo(t) and the reference signal Vref(t), and outputs a voltage signal S1. The voltage signal S1 is compared with a triangular wave (ramp signal) by a comparator 820 to generate a pulse signal PWM so as to control the turning on and turning off of the switches M2 and M3 of the primary-side switching circuit 110. The control method that can be adopted by the present embodiment is not limited to the comparison circuit 800 shown in FIG. 8. Other analog/digital control methods that can achieve the same function may also be used to implement the present disclosure, or the present disclosure may be implemented by adopting digital implementation methods, such as a digital signal processor (DSP), a microcontroller (MCU), depending on practical needs.

Figure 9:
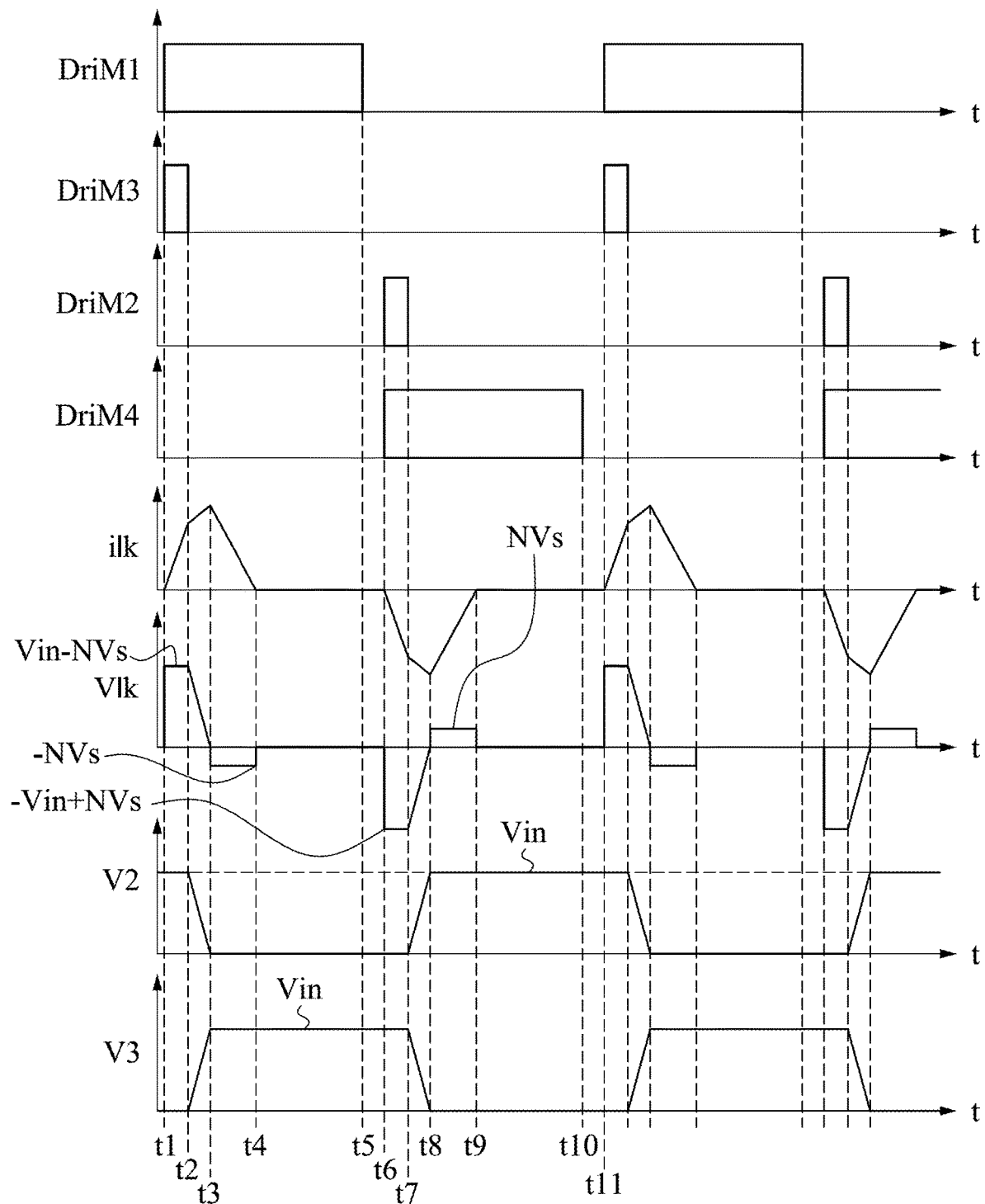
FIG. 9 depicts a schematic diagram of drive waveforms of a converter according to another embodiment of the present disclosure.

FIG. 9 depicts a schematic diagram of drive waveforms of a converter according to another embodiment of the present disclosure. It is noted that the drive waveforms for driving the converter 100 shown in FIG. 1 are different from the drive waveforms of the embodiment shown in FIG. 2 to realize the control method shown in FIG. 7. A detailed description is provided as follows.

Figure 10:
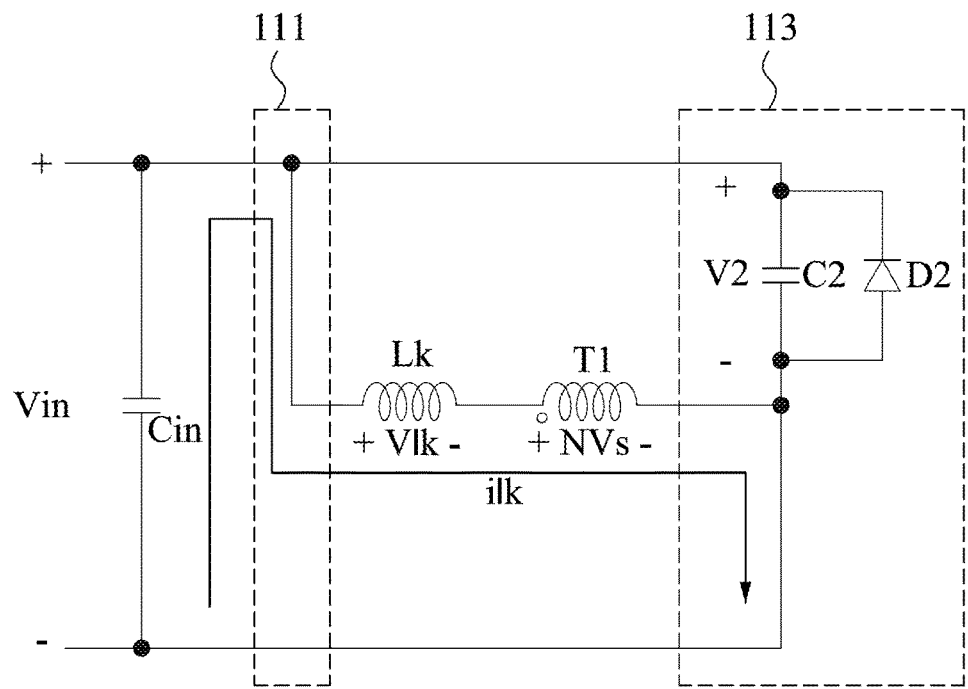
FIG. 10 depicts a schematic diagram of operations of a converter according to another embodiment of the present disclosure.
Figure 11:
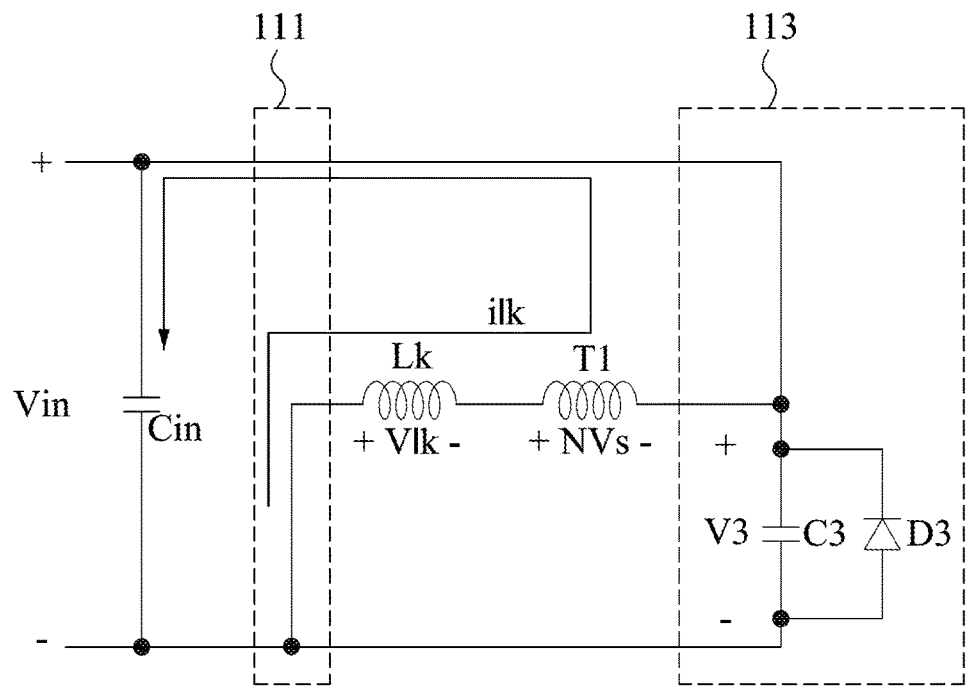
FIG. 11 depicts a schematic diagram of operations of a converter according to another embodiment of the present disclosure.

As shown in FIG. 9, the difference between FIG. 9 and FIG. 2 is during the period t1-t2 and the period t6-t7. In greater detail, during the period t1-t2 of FIG. 9, the upper switch M1 of the first bridge arm 111 and the lower switch M3 of the second bridge arm 113 are simultaneously turned on. The leakage inductor Lk of the transformer 120 and the input capacitor Cin generate an oscillating current ilk. At the same time, energy is transmitted to the secondary side of the transformer 120. The above operations may be referred to the circuit operation diagram shown in FIG. 10 to facilitate understanding. During the period t6-t7, the lower switch M4 of the first bridge arm 111 and the upper switch M2 of the second bridge arm 113 are simultaneously turned on. The leakage inductor Lk of the transformer 120 and the input capacitor Cin generate a reverse oscillating current ilk. At the same time, energy is transmitted to the secondary side of the transformer 120. The above operations may be referred to the circuit operation diagram shown in FIG. 11 to facilitate understanding. The working states during the rest of the periods are the same as the working states described in FIG. 2.

As shown in FIG. 9, the respective turn-on time of the switches M2 or M3 can be additionally controlled to control a magnitude of the energy transmitted to the secondary side of the transformer 120, therefore the output voltage Vo(t) follows the reference voltage Vref(t) shown in FIG. 7. As a result, the soft-start function can be realized. In one embodiment, as shown in FIG. 9, the turn-on time of the switches M2 or M3 of the second bridge arm 113 is greater than 0 and less than ½ of the switching period tsw. Additionally, the turn-on time of the lower switch M3 of the second bridge arm 113 is less than the turn-on time of the upper switch M1 of the first bridge arm 111, and the turn-on time of the upper switch M2 of the second bridge arm 113 is less than the turn-on time of the lower switch M4 of the first bridge arm 111.

After the soft start of the converter 100 is completed, the stable state is entered. At this time, the switches M1 to M4 of the converter 100 operate under an unadjusted state of substantial 50% duty ratio. For example, the turn-on time of each of the upper switch M1 and the lower switch M4 of the first bridge arm 111 is substantially ½ of the switching period tsw, and the turn-on time of each of the upper switch M2 and the lower switch M3 of the second bridge arm 111 is substantially ½ of the switching period tsw. In addition, a drive signal for driving the upper switch M1 of the first bridge arm 111 and a drive signal for driving the lower switch M3 of the second bridge arm 113 are the same, and a drive signal for driving the lower switch M4 of the first bridge arm 111 and a drive signal for driving the upper switch M2 of the second bridge arm 113 are the same. In addition to that, the drive signal for driving the upper switch M1 of the first bridge arm 111 is complementary to the drive signal for driving the lower switch M4 of the first bridge arm 111.

Figure 12:
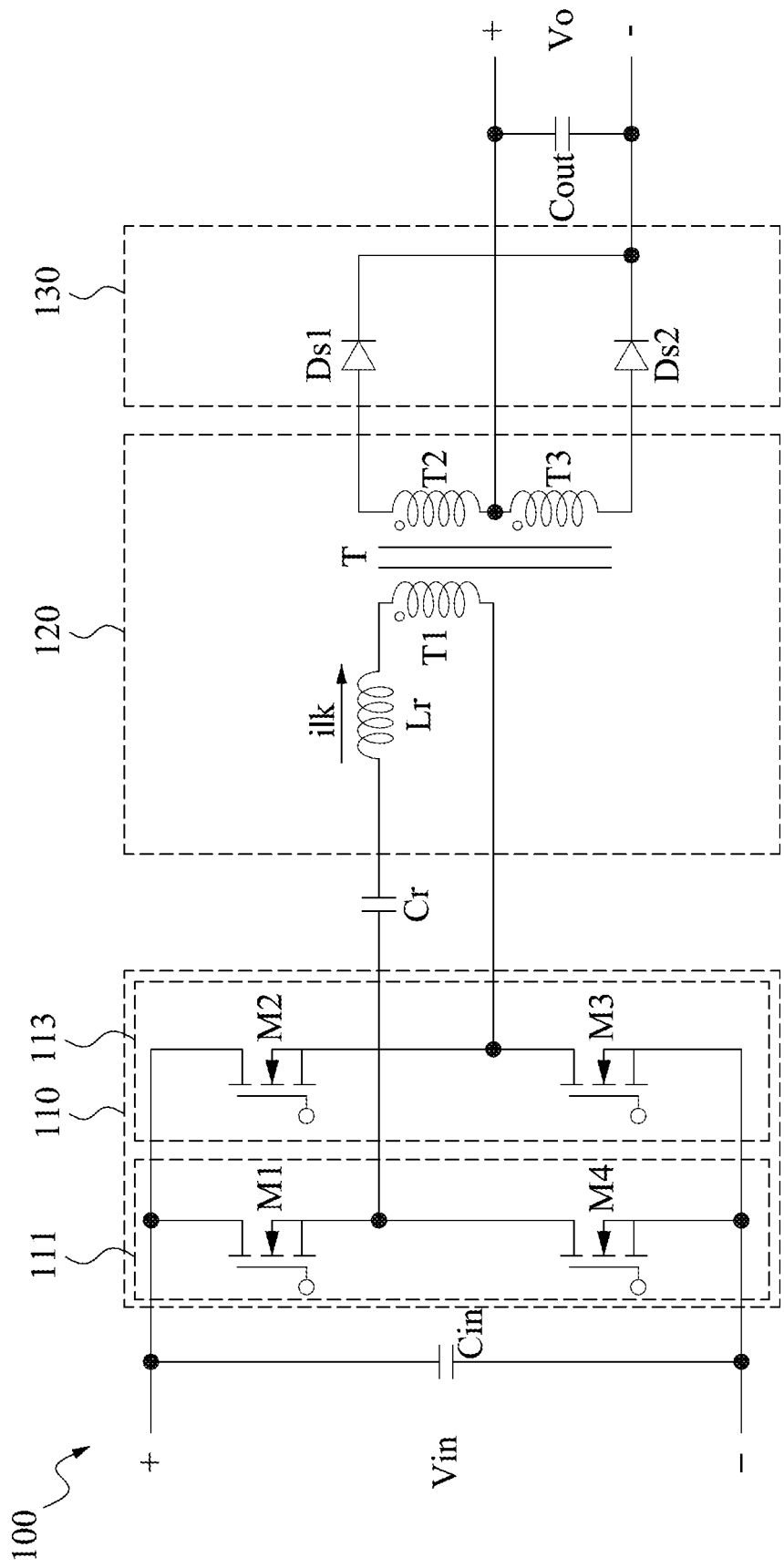
FIG. 12 depicts a schematic diagram of a circuit of a converter according to another embodiment of the present disclosure.

FIG. 12 depicts a schematic diagram of a circuit of a converter 100 according to another embodiment of the present disclosure. It is noted that the converter 100 of FIG. 12 differs from the converter 100 of FIG. 1 in that the converter 100 of FIG. 12 has a capacitor Cr connected in series between two midpoints of the first bridge arm 111 and the second bridge arm 113, which can also be regarded as being coupled between the primary-side switch circuit 110 and the transformer 120. The capacitor Cr is coupled in series with the inductor Lr according to the present embodiment. In addition to that, the inductor Lr of FIG. 12 may be a leakage inductor of the transformer 120, or may be an external inductor. Under the circumstances that the first bridge arm 111 is turned on and the second bridge arm 113 is not turned on, the capacitor Cr, the parasitic capacitors of the switches M2, M3 of the second bridge arm 113, and the inductance Lr oscillate. At the same time, energy is transmitted to the secondary side of the transformer 120. The operations here are similar to the operations shown in FIG. 2 to FIG. 6. In addition, under the circumstances that both the first bridge arm 111 and the second bridge arm 113 are turned on, the capacitor Cr, the input capacitor Cin, and the inductor Lr oscillate. At this time, if a capacitance value of the input capacitor Cin is much greater than that of the capacitor Cr, the inductor Lr oscillates only with the capacitor Cr, and energy is transmitted to the secondary side of the transformer 120.

In another embodiment, the secondary-side switch circuit 130 according to the present disclosure may be a full bridge rectifier circuit. Each of diodes of the secondary-side switch circuit 130 may be replaced by a metal oxide semiconductor field effect transistor (MOSFET). In other embodiments, the secondary-side switch circuit 130 according to the present disclosure may be a half wave rectifier circuit.

It is thus understood from the above embodiments of the present disclosure that application of the present disclosure has the following advantages. The embodiments of the present disclosure provides a converter to improve the problem that the pulse causes the output voltage to instantaneously rise under the circumstances that the output voltage is 0 at the moment when the switch is turned on if the soft start is applied to the converter without an output inductor. In addition, the converter according to the embodiments of the present disclosure does not require the additional switching element. As a result, the cost of the converter is reduced, and the complexity of the implementation of the overall control scheme can be further reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A converter, comprising:
   an input capacitor configured to receive an input voltage;
   a primary-side switch circuit coupled to the input capacitor, comprising:
      a first bridge arm comprising at least two switches, the at least switches being coupled in series; and
      a second bridge arm comprising at least two switches, the at least switches being coupled in series;
   a transformer coupled to the primary-side switch circuit;
   an inductor coupled to the primary-side switch circuit, wherein the inductor is a leakage inductor of the transformer or an external inductor coupled between the transformer and the primary-side switch circuit;
   a secondary-side switch circuit coupled to the transformer; and
   an output capacitor coupled to the secondary-side switch circuit;
   wherein a soft-start period of an output voltage from the converter comprises a voltage rising period of the output voltage, wherein a turn-on time of one of the at least two switches of the first bridge arm is less than ½ of a switching period, a turn-on time of one of the at least two switches of the second bridge arm is a value selected from zero to $\frac{1}{100}$ of the switching period, wherein the inductor and parasitic capacitors of the at least two switches of the second bridge arm oscillate, and energy generated from an oscillation is transmitted to the second-side switch circuit.

2. The converter of claim 1, wherein the turn-on time of one of the at least two switches of the second bridge arm is less than $\frac{1}{100}$ of the switching period.

3. The converter of claim 2, wherein the first bridge arm comprises an upper switch and a lower switch, the second bridge arm comprises an upper switch and a lower switch, wherein a turn-on time of the lower switch of the second bridge arm is less than a turn-on time of the upper switch of the first bridge arm, a turn-on time of the upper switch of the second bridge arm is less than a turn-on time of the lower switch of the first bridge arm.

4. The converter of claim 1, further comprising:
   a capacitor coupled between the primary-side switch circuit and the transformer.

5. The converter of claim 4, wherein the capacitor and the inductor are coupled in series.

6. The converter of claim 5, wherein when one of the at least two switches of the first bridge arm is turned on, the capacitor, the parasitic capacitors of the at least two switches of the second bridge arm, and the inductor oscillate, and energy generated from the oscillation is transmitted to the second-side switch circuit.

7. The converter of claim 4, wherein the transformer comprises:
   at least one magnetic core;
   at least one primary-side winding coupled to the primary-side switch circuit; and
   at least one secondary-side winding coupled to the secondary-side switch circuit, wherein the capacitor is coupled in series between the primary-side switch circuit and the at least one primary-side winding of the transformer.

8. The converter of claim 7, wherein the at least one primary-side winding and the at least one secondary-side winding are coupled through the at least one magnetic core, wherein the at least one secondary-side winding of the transformer and the secondary-side switch circuit form a center-tap full wave rectifier circuit or a full bridge rectifier circuit or a half wave rectifier circuit, and is connected in parallel with the output capacitor to form an output terminal of the transformer.

9. The converter of claim 1, wherein the at least two switches are controlled out of phase by 180 degrees.

10. The converter of claim 1, wherein the turn-on time of one of the at least two switches of the second bridge arm is zero, wherein the inductor and the parasitic capacitors of the at least two switches of the second bridge arm oscillate, and energy generated from the oscillation is transmitted to the second-side switch circuit.

11. The converter of claim 1, wherein after the soft-start period is completed, a turn-on time of each of the at least two switches of the first bridge arm is substantially ½ of the switching period, a turn-on time of each of the at least two switches of the second bridge arm is substantially ½ of the switching period, wherein drive signals for driving an upper switch of the first bridge arm and a lower switch of the second bridge arm are the same, drive signals for driving a lower switch of the first bridge arm and an upper switch of the second bridge arm are the same, and the drive signals for driving the upper switch of the first bridge arm and the lower switch of the first bridge arm are complementary to each other.

12. A converter, comprising:
an input capacitor configured to receive an input voltage;
a primary-side switch circuit coupled to the input capacitor, comprising:
  a first bridge arm comprising an upper switch and a lower switch connected in series; and
  a second bridge arm comprising an upper switch and a lower switch connected in series;
a transformer coupled to the primary-side switch circuit;
an inductor coupled to the primary-side switch circuit, wherein the inductor is a leakage inductor of the transformer or an external inductor coupled between the transformer and the primary-side switch circuit;
a secondary-side switch circuit coupled to the transformer; and
an output capacitor coupled to the secondary-side switch circuit;
wherein a soft-start period of an output voltage from the converter comprises a voltage rising period of the output voltage, wherein a turn-on time of one of the at least two switches of the first bridge arm is less than ½ of a switching period, a turn-on time of one of the at least two switches of the second bridge arm is greater than 0 and less than ½ of the switching period, wherein a turn-on time of the lower switch of the second bridge arm is less than a turn-on time of the upper switch of the first bridge arm, a turn-on time of the upper switch of the second bridge arm is less than a turn-on time of the lower switch of the first bridge arm, wherein the inductor oscillates with the input capacitor or parasitic capacitors of the switches of the second bridge arm, and energy generated from an oscillation is transmitted to the second-side switch circuit.

13. The converter of claim 12, wherein the turn-on time of one of the upper switch and the lower switch of the second bridge arm is adjusted based on a comparison result of the output voltage and a reference voltage.

14. The converter of claim 12, wherein the inductor oscillates with the input capacitor and energy generated from the oscillation is transmitted to the second-side switch circuit.

15. The converter of claim 12, further comprising:
a capacitor coupled between the primary-side switch circuit and the transformer.

16. The converter of claim 15, wherein the capacitor and the inductor are coupled in series.

17. The converter of claim 16, wherein when one of the upper switch and the lower switch of the first bridge arm and one of the upper switch and the lower switch of the second bridge arm are turned on, the input capacitor and the capacitor oscillate with the inductor, and energy generated from the oscillation is transmitted to the second-side switch circuit.

18. The converter of claim 16, wherein when one of the upper switch and the lower switch of the first bridge arm is turned on, the capacitor, the parasitic capacitors of the upper switch and the lower switch of the second bridge arm, and the inductor oscillate, and energy generated from the oscillation is transmitted to the second-side switch circuit.

19. The converter of claim 12, wherein the upper switch and the lower switch of the first bridge arm are controlled out of phase by 180 degrees, wherein the upper switch and the lower switch of the second bridge arm are controlled out of phase by 180 degrees.

20. The converter of claim 16, wherein at least one primary-side winding of the transformer and the at least one secondary-side winding are coupled through at least one magnetic core of the transformer, wherein the at least one secondary-side winding of the transformer and the secondary-side switch circuit form a center-tap full wave rectifier circuit or a full bridge rectifier circuit or a half wave rectifier circuit, and is connected in parallel with the output capacitor to form an output terminal of the transformer.

* * * * *